Fig. 1

INVENTOR.
FRANK G. VOLKEL

May 30, 1950 — F. G. VOLKEL — 2,509,402
CRYSTAL GRINDING DEVICE
Filed July 31, 1945 — 5 Sheets-Sheet 2

INVENTOR.
FRANK G. VOLKEL
BY
ATTORNEY

May 30, 1950 F. G. VOLKEL 2,509,402
CRYSTAL GRINDING DEVICE
Filed July 31, 1945 5 Sheets-Sheet 3

INVENTOR.
FRANK G. VOLKEL
BY
ATTORNEY

May 30, 1950  F. G. VOLKEL  2,509,402
CRYSTAL GRINDING DEVICE
Filed July 31, 1945  5 Sheets-Sheet 5

INVENTOR.
FRANK G. VOLKEL
BY
ATTORNEY

Patented May 30, 1950

2,509,402

UNITED STATES PATENT OFFICE 2,509,402

CRYSTAL GRINDING DEVICE

Frank G. Volkel, Los Angeles, Calif., assignor to Volkel Bros. Machine Works, Los Angeles, Calif., a copartnership Application July 31, 1945, Serial No. 608,014

6 Claims. (Cl. 51—124)

This invention relates to machines for accurately facing objects or articles and relates in particular to a grinding and polishing machine.

The invention, as disclosed herein, although it has many uses, is especially adapted for the accurate grinding of the edges of crystals which are employed in radio devices.

It is an object of the invention to provide a device capable of performing an accurate grinding of these crystals and of many other articles, including jewels and other hard materials, as well as softer materials, if desired. A further object of the invention is to provide a grinding device which is of simple and economical construction, and avoids many of the disadvantages found in grinding devices, wherein a carriage which carries the work is moved back and forth in guides or ways. In the present invention, the work carrying part is supported in radial bearings, so that it has a swinging movement instead of a straight line movement, this manner of supporting the work holding means for swinging movement cooperating with a very simple means for producing the swinging movement, and controlling the swinging movement so that the work supporting means travels slowly during the working stroke and moves rapidly during the return stroke or movement.

A further object of the invention is to provide a simple means for producing relative movement of the tool or grinding wheel and the work support so that the tool or grinding wheel and the work are progressively brought closer together as the facing operation progresses. It is a further object of the invention to provide a feed mechanism which may be operated manually or automatically and which may be set so as to discontinue the feed at a predetermined point.

An object of the invention is to provide a device of the character herein set forth having a simple adjustable feed mechanism which is incorporated in and supported by the oscillating support for the work on which the facing operation is being performed.

A further object of the invention is to provide a device of this character having a work holder of simple form, in association with other parts, whereby a simple and effective device is attained.

A further object of the invention is to provide a device of this character having an adjustable work holder and a simple means for adjusting the angularity of the work with relation to the rotating tool.

A further object of the invention is to provide a simple feed mechanism wherein the force to produce the feed movement is applied through a yieldable part which will yield when the predetermined end of the feed movement or distance is reached.

It is an object of the invention to provide a device of this character having a simple feed means in conjunction with a stop adjustable into a position determining the point at which the facing operation is to conclude, and yieldable means for gradually carrying on the feed movement until the stop is reached, the stop then preventing feeding action.

A further object of the invention is to provide a simple means for adjusting the rate of speed, and a further object is to provide a simple feeding means which accomplishes the feeding action at the end of the return stroke of the work holder, the result being that there is substantially no cutting action during the return stroke.

Further objects, features, and advantages of the invention will be brought out in the following part of the specification.

Referring to the drawings which are for illustrative purposes only.

The device includes a stand or base 10 which is of hollow structure so that a reservoir 11 for cutting or grinding fluid or compound may be placed in its lower part with a motor driven pump 12 for circulation of the liquid. On the upper portion of the stand 10 there is a supporting body 13 formed so as to provide a drain pan 14 from which a drain pipe 15 extends downward to the reservoir 11. On the supporting body 13 there is mounted a casting 16 having as a part thereof a tubular wall 17, and on this casting 16 a tubular spindle support 18 is secured in parallel relation to the axis of the wall 17. In the opposite ends of the spindle support 18 there are bearings 19 and 20 for supporting a shaft 21, the bearing 19 being fixed against axial movement in the support 18, and the bearing 20 being mounted in the support 18 so as to have small axial movement to compensate for changes in the length of the shaft or spindle 21 due to temperature changes. A spring 22 is placed so as to bear against the outer race of the bearing 20 so as to accomplish an axial pre-loading of the bearings 19 and 20, whereby any play in these bearings will be taken up and vibration of the spindle minimized.

Figures 2, 6:
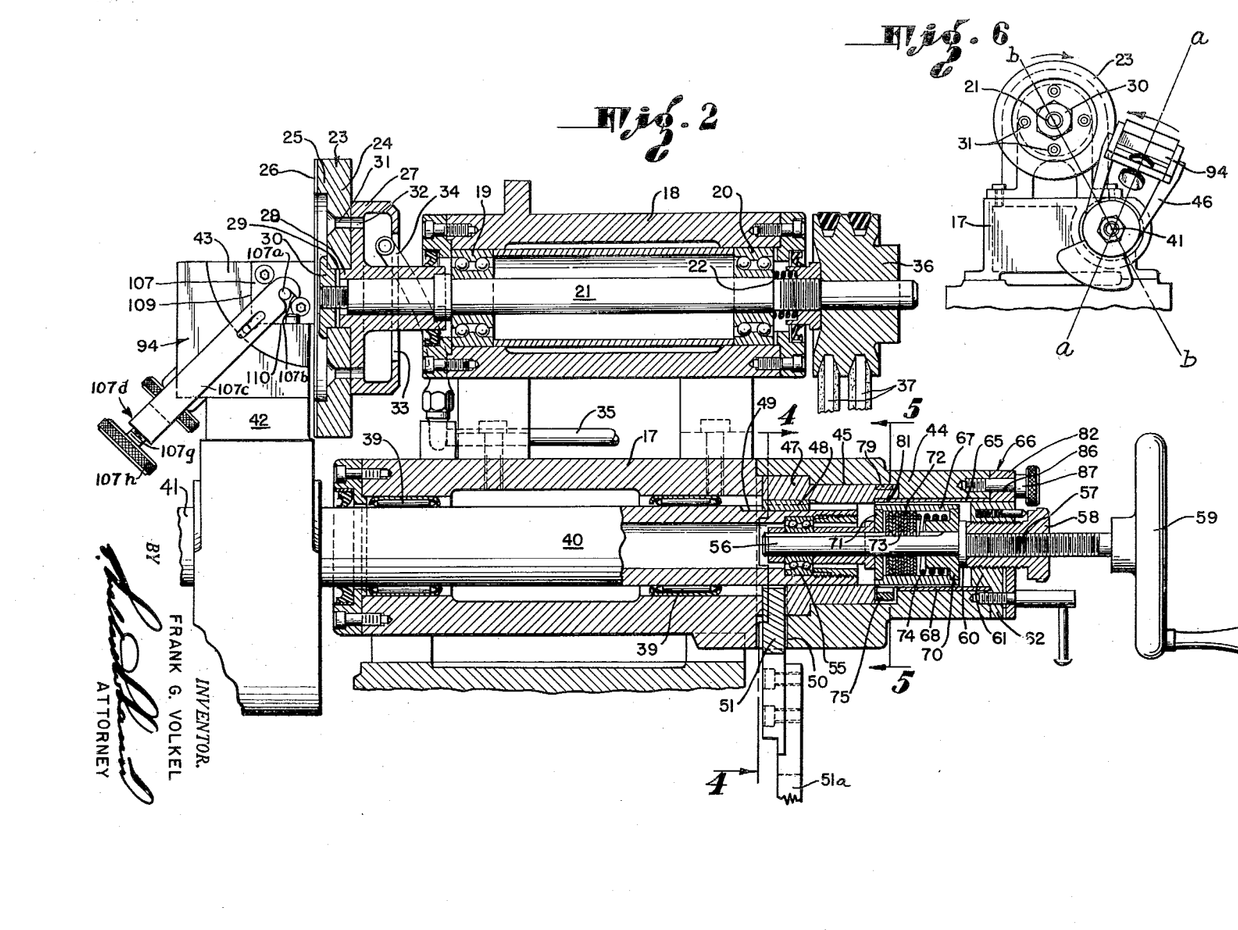
Fig. 2 is an enlarged fragmentary cross section taken as indicated by the line 2—2 of Fig. 3.
Fig. 6 is a front elevation of the upper portion of the device, shown to reduced scale.

On the forward end of the spindle 21, as best shown in Fig. 2, there is a rotary cutting tool 23, which, in the form of the invention shown for grinding crystals, consists of a disc 24 having a shallow forwardly extending lip 25, which lip 25 carries thereon the cutting element proper 26, which cutting element 26 consists in particles of diamond, or diamond dust, supported in a facing which lies in a plane substantially perpendicular to the axis of rotation of the spindle 21. The diamond particles constitute cutting teeth which cut, and thereby face, the object or part brought into contact therewith while the cutter 23 is in motion.

The cutter 23 is supported in operative position by being connected to the front face of a hollow body 27 which is mounted on the front projecting end of the spindle 21, this hollow body 27 having a shallow concentric boss 28 which fits into an opening 29 in the center of the disc 24, a nut 30 being screwed onto the front threaded end of the spindle 21 to hold the cutter 23 in place against the front wall of the hollow body 27. The disc 24 of the cutter 23 has openings 31 therethrough, inside the flange or lip 25 which communicates with openings 32 in the front wall of the hollow body 27. The rear wall of the hollow body 27 has an annular opening 33 through which the outlet end of a tube 34 is passed so as to conduct cutting, cooling or cleaning liquid into the hollow body, which liquid, due to centrifugal action, passes through the openings 32 and 31 to the front of the disc 24 and then passes outward over the face of the cutting element 26 to continuously wash the same. During the operation of the device, the liquid is constantly fed from the reservoir 11 through a conduit 35 which communicates with the pipe or nozzle 34. On the rear end of the spindle 21 there is a pulley 36 connected by belts 37 to a pulley 38 mounted on the shaft of a motor 38a which is secured to the stand 10.

As shown in Fig. 2, the tubular wall 17 has therein bearings 39 to support a hollow shaft 40 having a forwardly projecting end 41 on which a work carrier 42 is fixed, which work carrier 42 includes a work holder 43 at its outer end. The shaft 40 is disposed in eccentric relation to the spindle 21 and the work carrier 42 is swingable from the position in which it is shown in Fig. 6, in centralized relation to a line a—a, to a position in centralized relation to the line b—b, thereby carrying the work across one side of the annular cutting or grinding element 26 of the cutter 23. A tubular housing 44 is fixed on the rear end of the tubular wall 17, this tubular housing 44 having a counterbore 45 in which a sleeve 47 is turnable, the sleeve 47 having therein a key 48 which engages a keyway 49 in the hollow shaft 40 so that any rotary motion imparted to the sleeve 47 will be transmitted through the key 48 to the shaft 40 on which the work carrier 42 is fixed.

Figures 3, 4, 5:
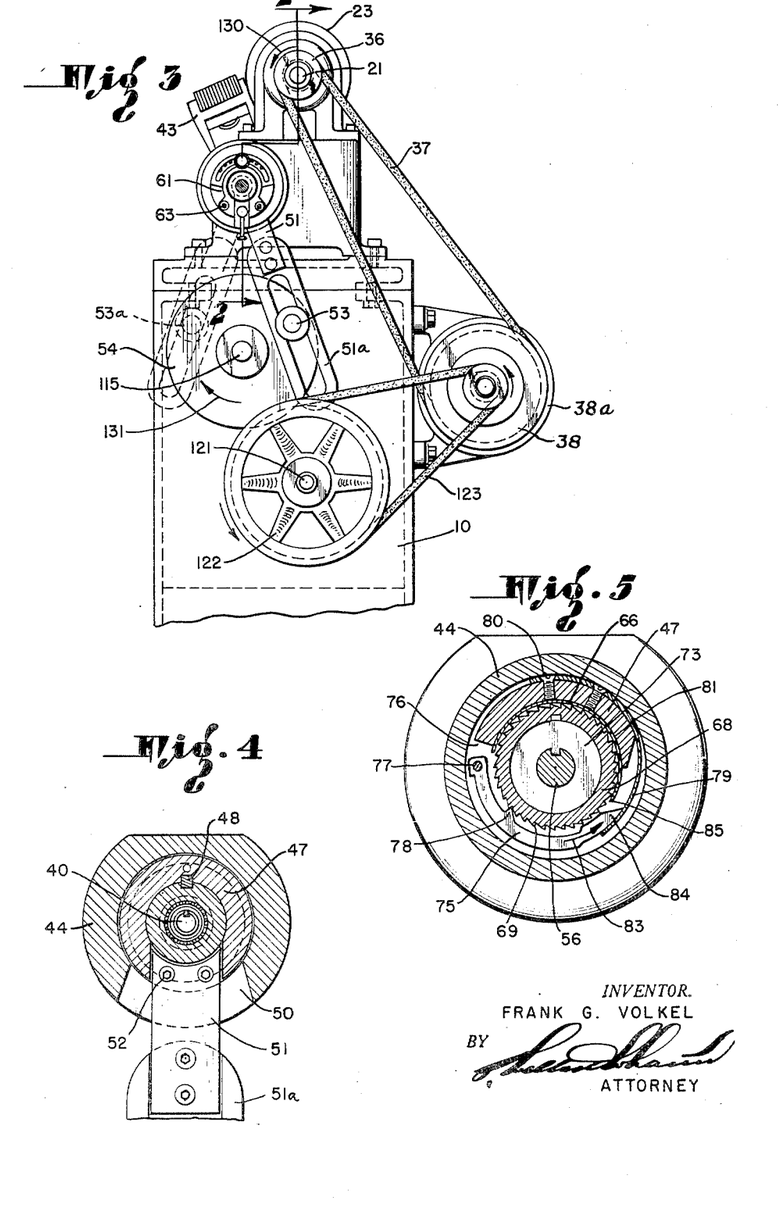
Fig. 3 is a rear elevational view of the upper portion of the device shown in Fig. 1.
Fig. 4 is a sectional view taken as indicated by the line 4—4 of Fig. 2.
Fig. 5 is a sectional view taken as indicated by the line 5—5 of Fig. 2.

A notch 50 in the lower part of the leftward end of the housing 44, Fig. 2, forms an arcuate slot through which a lever 51 may project from the sleeve 47, the lever 51 being connected to the sleeve 47, as shown in Fig. 4, by means of screws 52. This lever 51 has a slotted extension 51a engageable by a crank pin 53 carried by a rotating disc 54 whereby swinging movement is given the sleeve 47 so that the sleeve 47 will in turn transmit swinging movement through the key 48 to the shaft 40 to oscillate the work carrier 42. Relative feeding movement of the cutter or tool 23 and the work is accomplished by axial movement of the shaft 40. As shown in Fig. 2, the shaft 40 has within its rightward end a bearing 55 capable of transmitting axial thrust. The inner race of this bearing 55 is fixed on the leftward end of a stem 56 which has a screw 57 projecting rightwardly therefrom. The screw 57 threads through a sleeve nut 58 which normally remains stationary, and is moved only for purpose of adjustment. When the screw 57 is rotated by means of a handle 59, or by the automatic feed mechanism which will be later described, the stem will move axially, and this axial movement will be transmitted by the bearing 55 to the hollow shaft 40, thereby moving the work carrier 42 toward or away from the tool 23, dependent upon the direction of rotation of the screw 57.

Figures 7, 8, 9, 10:
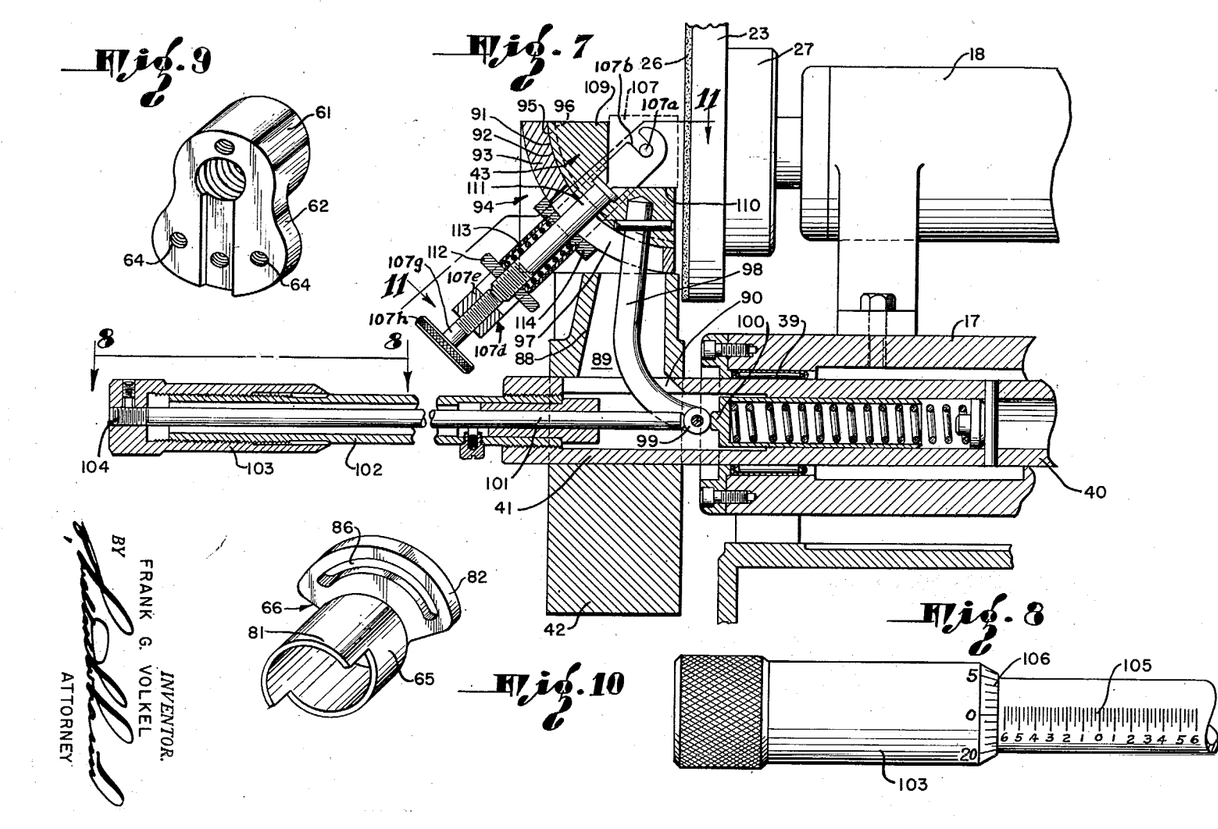
Fig. 7 is an enlarged fragmentary sectional view showing the work holder and the simple means for adjusting the angularity thereof.
Fig. 8 is an enlarged fragmentary elevational view of the handle and projecting stem of the angular adjusting means. This view shows the indicia for indicating the adjustment.
Fig. 9 is an enlarged perspective view of the adjusting block used in the device.
Fig. 10 is an enlarged perspective view of the feed adjusting member of the device.

The sleeve nut 58 is axially adjustable so that its leftward end, Fig. 2, will serve as a stop to be engaged by a collar 60 positioned between the stem 56 and the screw 57. When the collar 60 comes into engagement with the leftward end of the sleeve nut 58, there can be no further rightward movement of the work carrier 42. The sleeve nut 58 is threaded through a cylindric block 61 which is mounted so that it will project into the rightward end of the tubular housing 44. This block 61, as shown in Fig. 9, has a tongue or partial flange 62 extending downward therefrom, whereby it may be secured to the rightward end of the housing 44 by means of machine screws 63, Fig. 3, which extend through openings 64 in the wall 62. The external diameter of the block 61 is less than the internal diameter of the rightward end of the opening through the housing 44, to accommodate the thin wall 65 of a feed adjusting member 66 which is shown in perspective in Fig. 10.

Surrounding the stem 56 in a position between the rightward end of the shaft 40 and the collar 60 there is a yieldable drive member 67. This drive member 67 includes a cylindric shell 68 having ratchet teeth 69 cut thereon as shown in Fig. 5. This shell 68 is rotatable around the stem 56 and is supported by a thimble 70 at its rightward end and a radial wall 71 at its leftward end. Within the shell 68, between the members 70 and 71, there are two sets of friction clutch plates, the first set of plates 72 being of tongue and groove connection with the shell 68, and the second set of plates 73 having tongue and groove connection with the stem 56, there being a spring 74 to press the plates together so that when rotation is imparted to the shell 68, a rotational force will be carried by the friction clutch formed of the sets of discs 72 and 73 to the stem 56, to accomplish a rotation of the screw 57 which will feed the shaft 40 rightward.

A pawl 75, Figs. 2 and 5, is arranged to periodically impart small rotary motion to the shell 68. This pawl 75 is of arcuate form and is swingable in a recess 76 formed in the lower rightward end of the sleeve 47, on a pivot pin 77 which is disposed in parallel relation to the axis of the stem 56. This pawl 75 has an engaging point 78 disposed intermediate its ends for cooperation with the teeth 69 of the shell 68. An arcuate leaf spring, 79, secured to the sleeve 47 by screws 80, constantly urges the pawl 75 toward engagement with the ratchet consisting of the teeth 69.

When the crank 53, Fig. 3, revolves around the axis of the disc 54, the swinging motion of the lever 51 causes oscillation of the sleeve 47, and since the pawl 75 is mounted on the rightward end of the sleeve 47, it is likewise oscillated around a portion of the leftward end of the shell 68. In one direction of its movement around the axis of the stem 56, the pawl 75 will, through the engagement of its point 78 with the ratchet teeth 69, produce a small rotary movement of the shell 68 around the axis of the stem 56, and if the collar 60, Fig. 2, is out of engagement with the sleeve nut 58, the clutch means embodied within the sleeve 68 will transmit this rotary movement to the stem so that there will be a slight rightward advance of the screw 57 in the sleeve nut 58. However, the invention provides means for lifting the pawl 75 from engagement with the ratchet teeth 69 during the greater part of its oscillating movement, it being a feature of the invention to permit the pawl 75 to engage the ratchet and move the same only during a relatively short period of time at the end of the return movement of the work carrier 42 so that the feeding action of the device will occur just prior to the beginning of the working or forward stroke of the work carrier 42, with the result that a cut will be taken during this working stroke and there will be substantially no cutting action whatsoever during the return stroke of the work carrier 42. This lifting of the pawl 75 is accomplished by the feed adjusting member 66, the cylindric wall 65 of which is notched at its inner or leftward end so as to provide an arcuate wall 81. At the rightward or outer end of the thin cylindrical wall 65 there is a partial flange 82 which rests against the rightward end of the tubular housing 44 when the wall 65 is inserted into the rightward end of the housing 44 as shown in Fig. 2, the arcuate wall 81 at the leftward end of the cylindric wall 65 then projecting into the rightward end of the sleeve 47 so as to cover a portion of the teeth 69 of the shell 68. In Fig. 5 the pawl 75 is shown in the position which it assumes at the end of the return stroke of the work carrier 42. When the working or forward stroke of the work carrier 42 occurs, the pawl 75 will move in the direction indicated by the arrow 83, and its chamfered end 84 will engage and ride up over the end 85 of the arcuate wall 81, the pawl 75 being thereby lifted and maintained out of engagement with the ratchet teeth 69 throughout the continuation of the working movement and throughout that portion of the return movement of the work carrier 42, opposite the direction indicated by the arrow 83, required to carry the end 84 of the pawl 75 off of the end 85 of the arcuate wall 81, at which time the spring 79 will press the pawl 75 into engagement with a ratchet tooth, and during the small remaining return movement the pawl 75 will turn the shell 68. By rotating the member 66, the position of the end 85 of the arcuate wall 81 may be changed, thereby varying the time or distance which the end 84 of the pawl 75 is out of engagement with the wall 81, and thereby varying the number of ratchet teeth 69 which the pawl 75 will advance. To permit this rotary adjustment of the member 66, its partial flange 82 is provided with an arcuate slot 86 through which a clamping screw 87 is passed. If the member 66 is rotated from the position in which it is shown, in the direction indicated by the arrow 83, the rate of feed will be increased. The reverse is true, if the member 66 is rotated in a direction contrary to the arrow 83.

Referring to Fig. 3, the crank pin 53 is shown in full lines in the position it assumes at the end of the return stroke or at the beginning of the working stroke of the work carrier 42. Rotation of the disc 54 carries the pin 53 downward in clockwise direction from its full line position and the end of the working stroke is reached when the pin 53 arrives at the position in which it is indicated in dotted lines 53a, the working stroke consuming approximately two-thirds of the full circle of rotation of the pin 53 around the center of the disc 54. Therefore the working stroke of the lever 51 and of the work carrier 42 takes substantially twice as long as the return stroke, which is accomplished by clockwise rotation of the pin from its dotted line position 53a to the position in which it is shown in full lines.

Figure 1:
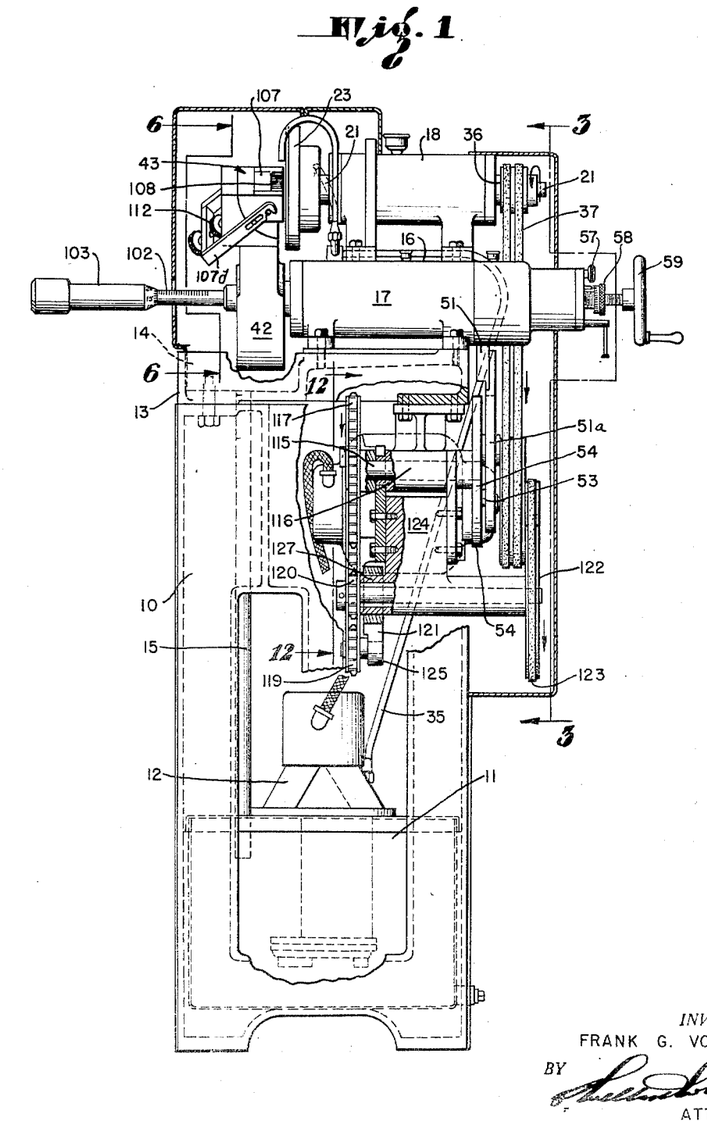
Fig. 1 is a partly sectioned side elevation of the invention.
Figures 11, 12:
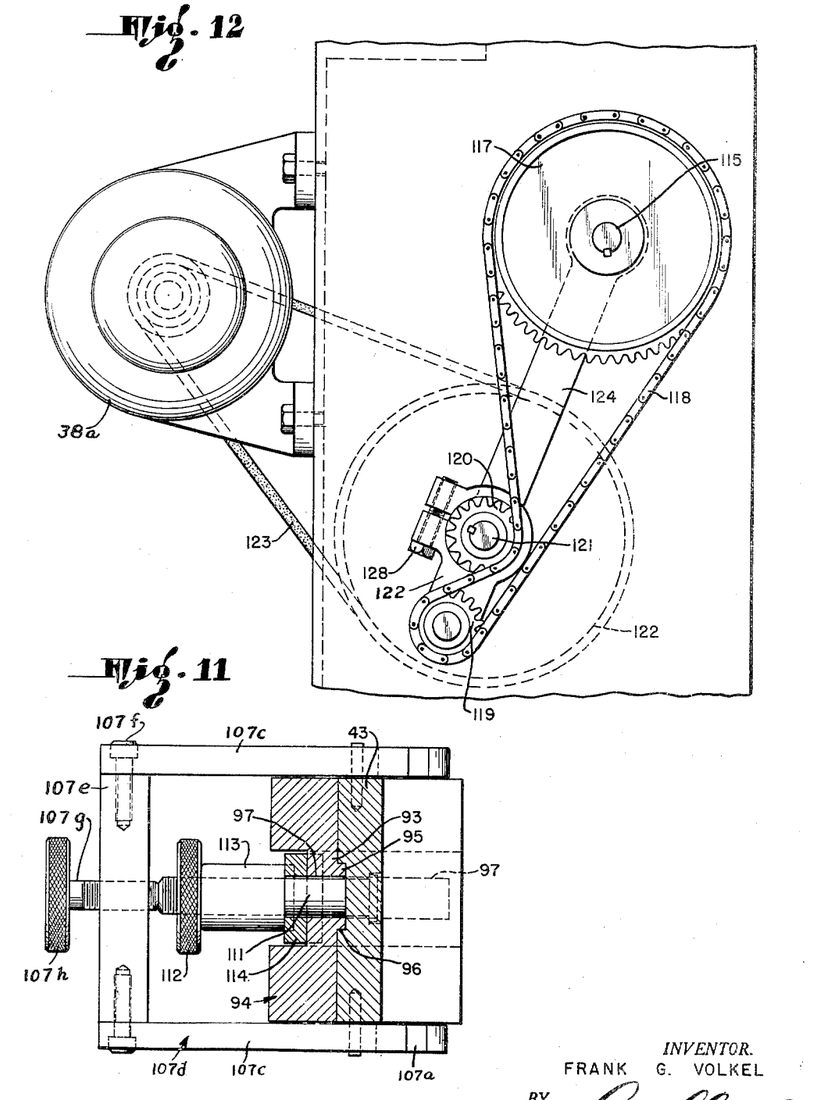
Fig. 11 is a cross section taken as indicated by the line 11—11 of Fig. 7.
Fig. 12 is an elevational view of the disc drive taken from the position indicated by the line 12—12 of Fig. 1.

As shown in Figs. 2, 6, and 7, the work carrier 42 includes an arm 88 having an opening 89 which communicates with an opening 90 in the side wall of the extending portion 41 of the hollow shaft 40. The work holder 43 consists of substantially a quadrant of a cylinder and has an arcuate face 91 which rests in an arcuate seat 92 formed by the curved wall 93 of a member 94 which is secured at the upper arm 88. As shown in Fig. 11, the wall 93 has a tongue 95 which enters a companion groove 96 in the member 43 to maintain lateral alignment of the member 43 with the supporting wall 93, and in the wall 93 there is a slot 97, the lower end of which lies above the upper end of the opening 89 so that an arm 98 may be extended from the holder 43 through the slot 97, the opening 88, and the opening 90 into the interior of the shaft 40, the lower end of this arm 98 being curved rightwardly as shown in Fig. 7. The lower end of the arm 98 is engaged by adjustment means carried by the shaft 40 for the purpose of rotating the holder 43 around an axis which is substantially parallel to the face of the tool 23. A small roller 99 on the lower end of the arm 98 is engaged on one side by a spring pressed member 100 and on the other side by a pin or rod 101 which projects leftward through a sleeve 102 which is threaded into the leftward end of the shaft 40. An adjusting ferrule 103 is threaded onto the leftward end of the sleeve 102 and is fixed on the outer end 104 of the rod 101, as shown at 104, so that the axial movement of the member 103 due to its rotation on the threaded portion of the sleeve 102 will be transmitted to the rod 101 to the lower end of the arm 98. The surface of the sleeve and the chamfered end of the ferrule 103 have cooperating micrometric graduations 105 and 106 for reference by the operator in adjusting the holder 43 through very small angles of rotation. The position of the lower end of the arm 98 is determined by the position of the rod 101 against the inner end of which the roller 99 is held by the spring pressed member 100. The work holder 43 is formed so as to receive the work which may consist of a body 107 in which the crystals 108 are held as shown in Fig. 1. As to an external form, the work body 107 is a rectangular prism, and so as to receive the same, the work holder 43 has faces 109 and 110 disposed at right angles so as to provide a V-shaped recess in which the work bodies 107 may be clamped by the simple means which the invention provides. As shown in Fig. 7, a pin 111 extends radially from the work holder 43 through the slot 97 in the arcuate wall 93, and threaded on the outer end of the pin 111 is a nut 112 which compresses a spring 113 arranged to bear against a friction plate 114 which is in sliding engagement with the outer face of the arcuate wall 93. The work body 107 has trunnions 107a projecting outwardly of the ends, said trunnions being received in hook-like notches 107b adjacent the free ends of the side arms 107c with a substantially U-shaped yoke, indicated generally at 107d. The bottom member 107e, to which the adjacent ends of arms 107c are secured by screws 107f, is provided with a threaded bore for reception of a screw 107g having an adjusting knob 107h adjacent its outer end. The opposite or inner end of the screw 107g engages the adjacent or outer end of the pin 111. Each arm 107c has a longitudinally extending slot 107j for slidable reception of a pin 107k fixed in the adjacent end of the work holder 43. Thus the body 107 may be securely held in position in the work holder 43 and the various parts of the assembly are positively retained in their proper position, although permitting angular adjustment.

The disc 54, as shown in Figs. 1 and 3, is fixed on one end of a shaft 115, rotatably carried by a bracket 116 as shown in Fig. 1. As shown in Figs. 1 and 12, a sprocket 117 is fixed on the other end of the shaft 115, this sprocket 117 being driven by a chain 118 which also runs over an idler sprocket 119. The chain 118 is driven by a spiral sprocket 120 carried by a shaft 121 which has on its rearward end, as best shown in Fig. 1, a sheave 122 driven from the motor 38a by a belt 123.

The shaft 121 is supported by a bracket 124 which is swingable around the axis of the shaft 115, so that by swinging of the bracket 124, the sheave 122 may be moved with relation to the motor shaft so as to tighten the belt 123, without changing the spatial relation of the shafts 115 and 121. The idler sprocket 119 is adjustably carried below the drive sprocket 120 by an adjustable arm 125 which is swingable around the axis of the shaft 121 so as to give proper tension to the chain 118. This adjustable arm 125 has a split ring 126 which surrounds a cylindric boss 127 carried by the bracket 124 in a position surrounding the shaft 121 adjacent the sprocket 120. When a clamping screw 128, Fig. 12, is loosened, the arm 125 may be rotated around the boss 127 until the desired working condition of the belt 118 is reached, after which the screw 128 is again tightened. This arrangement, as indicated by the arrows 130 and 131 of Fig. 3, gives the disc 54 a direction of operation opposite to the rotation of the spindle 21. The direction of rotation of the spindle 21 is the same as that of the motor shaft, but the drive arrangement, clearly shown in Fig. 12, gives to the disc 54 a rotation opposite to that of the motor. The portion of the cutter or diamond charged cutting element 26 engaged by the work moves downward in view of the direction of rotation of the spindle 21, and the force transmitted from the moving surface of the cutting element 26 to the work tends to move the work downwardly so as to hold it tightly in the work holder.

I claim as my invention:

1. In a device of the character described, the combination of: a rotary tool; means for rotating the tool; shaft means disposed at a side of said tool; an arm supported by said shaft means so that its outer end will swing forth and back across the face of said tool; a work holder adjustably connected to the outer end of said arm, said work holder having a depression to receive a work body; a work body to engage said depression, said body having trunnions projecting from the ends thereof; a yoke extending across the back of said work holder, said yoke having a pair of arms extending across the sides of said holder to engage said trunnions; cam means for moving said yoke so as to tighten said body against said holder; means for adjusting the angular relation of said holder to said tool; means for swinging said arm so that the work carried by said holder will be moved forth and back across the face of said tool; and means for producing a relative feeding movement of said holder and said tool whereby said tool and the work may be moved toward each other.

2. In a device of the character described, the combination of: a rotary tool; means for rotating the tool; shaft means disposed at a side of said tool; an arm suported by said shaft means so that its outer end will swing forth and back across the face of said tool; a work holder adjustably connected to the outer end of said arm, said work holder having a depression to receive a work body; a work body to engage said depression, said body having trunnions projecting from the ends thereof; a yoke extending across the back of said work holder, said yoke having a pair of arms extending across the sides of said holder to engage said trunnions; cam means for moving said yoke so as to tighten said body against said holder; an adjusting screw means carried by said shaft means; an arm extending from said holder to said adjusting screw means whereby adjusting movement may be transmitted from said adjusting screw means to said holder; a sleeve on said shaft means connected to the screw of said screw means so that it will have movement along said shaft means as said screw means is rotated, there being indications on the surface of said shaft means traversed by said sleeve for showing the adjustment of said holder; means for swinging said arm so that the work carried by said holder will be moved forth and back across the face of said tool; and means for producing a relative feeding movement of said holder and said tool whereby said tool and the work may be moved toward each other.

3. In a device of the character described, the combination of: a rotary tool; means for rotating the tool; shaft means disposed at a side of said tool; an arm supported by said shaft means so that its outer end will swing forth and back across the face of said tool; a work holder at the outer end of said arm, said work holder having a depression to receive a work body; a work body to engage said depression, said body having trunnions projecting from the ends thereof; a yoke extending across the back of said work holder, said yoke having a pair of arms extending across the sides of said holder to engage said trunnions; cam means for moving said yoke so as to tighten said body against said holder; means for swinging said arm so that the work carried by said holder will be moved forth and back across the face of said tool; and means for producing a relative feeding movement of said holder and said tool whereby said tool and the work may be moved toward each other.

4. In a device of the character described, the combination of: a rotary tool; means for rotating the tool; shaft means disposed at a side of said tool; an arm supported by said shaft means so that its outer end will swing forth and back across the face of said tool; a work holder adjustably connected to the outer end of said arm; means for adjusting the angular relation of said holder to said tool; a lever connected to said arm so as to extend radially from the axis of said shaft means; a crank rotating on an axis parallel to the axis of said shaft means, said crank having sliding connection with said lever whereby rotation of said crank will transmit to said lever and said arm, a fast forward swinging movement during less than half of its full circle of rotation and a slow return movement during the remainder of its circle of rotation; and means for producing a relative feeding movement of said holder and said tool whereby said tool and the work may be moved toward each other.

5. In a device of the character described, the combination of: a rotary tool; means for rotating the tool; shaft means disposed at a side of said tool; an arm supported by said shaft means so that its outer end will swing forth and back across the face of said tool; a work holder adjustably connected to the outer end of said arm; means for adjusting the angular relation of said holder to said tool; a lever connected to said arm so as to extend radially from the axis of said shaft means; a crank rotatable on an axis parallel to the axis of said shaft means, said crank having sliding connection with said lever whereby rotation of said crank will transmit to said lever and said arm a fast forward swinging movement during less than half of its full circle of rotation and a slow return movement during the remainder of its circle of rotation; a drive shaft having driving connection with said rotary tool; a shaft for said crank having a sprocket fixed thereon; an idler disposed in spaced relation to said sprocket; a chain running over said sprocket and said idler; a drive sprocket engaging said chain between said idler and said first named sprocket; means for driving said drive sprocket from said drive shaft; and means for producing a relative feeding movement of said holder and said tool whereby said tool and the work may be moved toward each other.

6. In a device of the character described, the combination of: a rotary tool; means for rotating the tool; shaft means disposed at a side of said tool; an arm supported by said shaft means so that its outer end will swing forth and back across the face of said tool; a work holder adjustably connected to the outer end of said arm; means for adjusting the angular relation of said holder to said tool; a lever connected to said arm so as to extend radially from the axis of said shaft means; a crank rotatable on an axis parallel to the axis of said shaft means, said crank having sliding connection with said lever whereby rotation of said crank will transmit to said lever and said arm a fast forward swinging movement during less than half of its full circle of rotation and a slow return movement during the remainder of its circle of rotation; a drive shaft having driving connection with said rotary tool; a shaft for said crank having a sprocket fixed thereon; an idler disposed in spaced relation to said sprocket; a chain running over said sprocket and said idler; a drive sprocket engaging said chain between said idler and said first named sprocket; and means for driving said drive sprocket from said drive shaft.

FRANK G. VOLKEL.

REFERENCES CITED

The following references are of record in the file of this patent:

UNITED STATES PATENTS

| Number | Name | Date |
|---|---|---|
| 376,854 | Cavert | Jan. 24, 1888 |
| 457,866 | Messaz | Aug. 18, 1891 |
| 500,561 | Carpenter et al. | July 4, 1893 |
| 523,504 | Armony | July 24, 1894 |
| 560,249 | Gifford | Oct. 23, 1900 |
| 901,909 | Johnston | Oct. 20, 1908 |
| 1,121,995 | Elvers | Dec. 22, 1914 |
| 1,230,595 | Osterholm | June 19, 1917 |
| 1,299,717 | Halstead | Apr. 8, 1919 |
| 1,462,653 | Osterholm | July 24, 1923 |
| 1,575,156 | Ecaubert | Mar. 2, 1926 |
| 1,799,763 | Raule | Apr. 7, 1931 |
| 1,920,073 | Gorton | July 25, 1933 |
| 1,929,214 | Plantinga | Oct. 3, 1933 |
| 1,972,160 | Osterholm | Sept. 4, 1934 |
| 2,174,869 | Swanson | Nov. 14, 1939 |
| 2,212,999 | Faulder | Aug. 27, 1940 |
| 2,246,023 | Spurling | June 17, 1941 |
| 2,248,262 | Wilhide | July 8, 1941 |
| 2,269,946 | Lange | Jan. 13, 1942 |
| 2,286,886 | Anderson | June 16, 1942 |
| 2,294,872 | Wood | Sept. 1, 1942 |
| 2,324,266 | Muskovin et al. | July 13, 1943 |
| 2,380,332 | Scheer | July 10, 1945 |
| 2,383,131 | Kirsch | Aug. 21, 1945 |
| 2,393,727 | Alber | Jan. 29, 1946 |
| 2,404,282 | Fruth | July 16, 1946 |
| 2,429,464 | Jearum | Oct. 21, 1947 |

Certificate of Correction

Patent No. 2,509,402                                                                 May 30, 1950

FRANK G. VOLKEL

It is hereby certified that errors appear in the printed specification of the above numbered patent requiring correction as follows:

Column 8, line 37, for "suported" read *supported*; column 10, line 37, list of references cited, for "Armony" read *Armeny*; line 38, for the patent number "560,249" read *660,249*; line 49, for "2,174,869" read *2,179,869*; line 59, for "Alber" read *Aber*;

and that the said Letters Patent should be read with these corrections therein that the same may conform to the record of the case in the Patent Office.

Signed and sealed this 19th day of September, A. D. 1950.

[SEAL]

THOMAS F. MURPHY,
*Assistant Commissioner of Patents.*